April 12, 1960
T. B. KEESLING
2,932,205
POWER OPERATED TOOL ATTACHMENT FOR
ELECTRIC DRILLS AND THE LIKE
Filed July 31, 1957
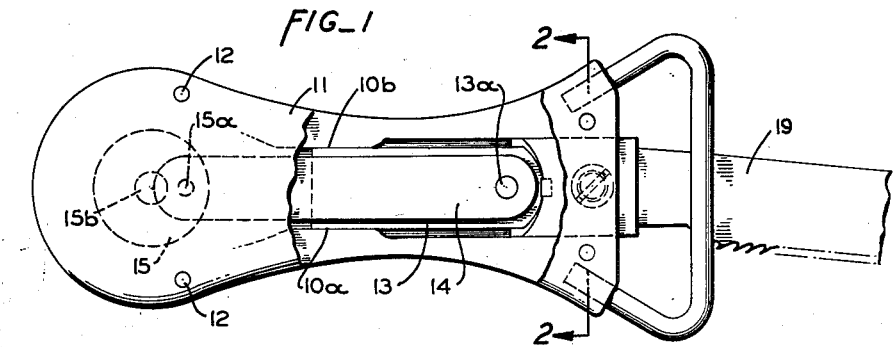
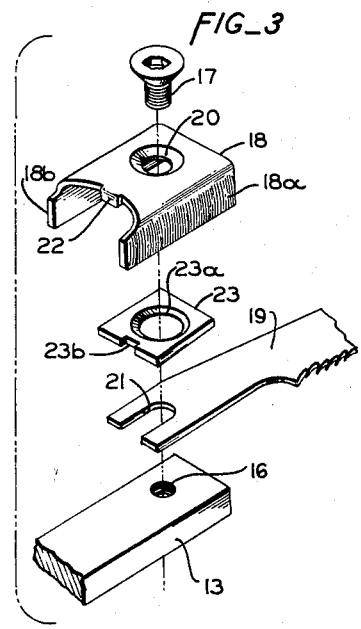
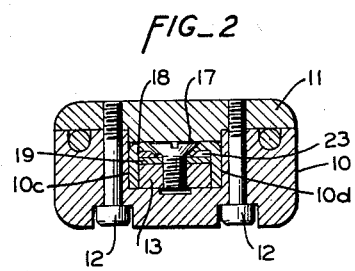
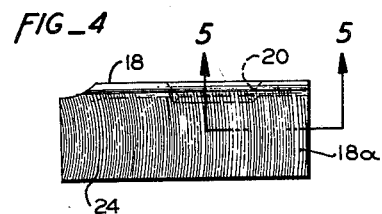
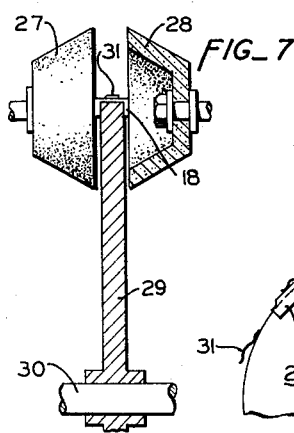
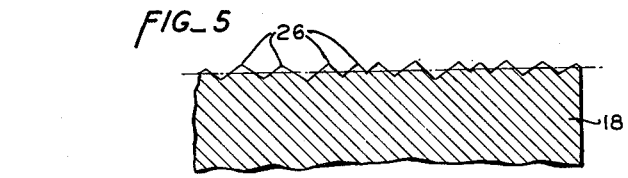
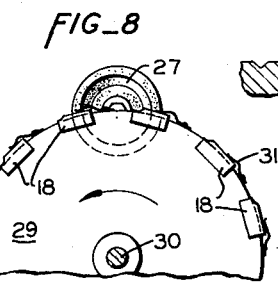
INVENTOR.
THOMAS B. KEESLING
BY Allen and Clancy
ATTORNEYS

United States Patent Office 2,932,205
Patented Apr. 12, 1960

2,932,205

POWER OPERATED TOOL ATTACHMENT FOR ELECTRIC DRILLS AND THE LIKE

Thomas B. Keesling, Los Gatos, Calif., assignor of one-half to C. H. Keesling, San Jose, Calif.

Application July 31, 1957, Serial No. 675,322

3 Claims. (Cl. 74—44)

This invention relates to power operated reciprocating tools, such as saws and the like, and is adapted to be driven by a device such as an electric drill. It is an object of this invention to provide a power operated saw or similar tool that is equipped with an improved means for lubricating sliding parts thereof.

Another object of this invention is to provide an improved power operated saw or similar tool with slidably contacting surfaces having fluted lubricant carrying areas for facilitating the distribution of lubricant to said slidable surfaces.

Still another object of this invention is to provide an improved power operated tool having reciprocating slidably contacting surfaces with curved lubricant gathering and discharging grooves functioning so that they gather lubricant in the inward stroke and tend to expel it during the outward stroke.

Other and further objects of this invention will be apparent to those skilled in the art to which it relates from the following specification, claims and drawing.

In accordance with this invention there is provided a power operated device that is adapted to be attached to an electric drill of the conventional type to be driven by the electric motor thereof. This power operated device may be a saw or similar tool which is adapted to be operated in a reciprocatory manner in performing the function for which it was intended and it is provided with an eccentric that is driven by means of a shaft which may be clamped in the chuck of the electric drill, said eccentric being coupled to a sliding member to which the saw or other tool is adapted to be clamped. In this manner the rotary motion of the shaft of the eccentric is translated into reciprocating motion which is employed to drive the saw.

The slide to which the saw is attached is positioned in a suitable casing which is also adapted to function as a hand grip, and in accordance with this invention the member that is employed for removably clamping the saw to the working end of the slide is provided with a plurality of elongated, arcuately shaped grooves on the surfaces thereof that slidably engage the casing. It has been found in extensive tests of this device that these grooves carry the lubricant in a very efficient manner and they are thereby instrumental in greatly reducing wear and consequently increasing the life of the device.

These and other features of this invention will be more fully described in the following specification and claims and set forth in the drawing in which briefly:

Figure 1 is a side view of an embodiment of this invention, said view being partially in section;

Figure 2 is a sectional view taken along the line 2—2 of Figure 1;

Figure 3 is an exploded view showing how the saw blade is attached to the working end of the slide and also showing the position of the lubricant carrying grooves on one side of the saw blade clamp;

Figure 4 is an enlarged view of one side of the saw blade clamp;

Figure 5 is a magnified sectional view showing the configuration of the small lubricant distributing grooves prior to tumbling of the clamp;

Figure 6 is a view similar to Figure 5 showing the configuration of the microscopic grooves after tumbling; and Figures 7 and 8 are views of an apparatus employed for grinding the grooves into the clamp surfaces.

Referring to the drawing specifically, there is shown in Figure 1 a power operated and hand controlled device of the type disclosed in my prior patent, No. 2,783,790 issued on March 5, 1957, and reference is made to this patent for details of construction that are not illustrated herein, as only so much of this device will be described as is essential to an understanding of the present invention. This device includes a body 10 having a cover 11, both of which may be of a die cast construction, and said cover may be attached to the body by means of suitable machine screws 12. For this purpose the body and cover are each provided with four holes that are adapted to receive said screws, said holes in the cover being threaded to retain the screws. A suitable cavity is formed in the body 10 for the purpose of receiving the slide member 13, the link 14 and the eccentric 15. The slide 13 is provided with a pin 13a that is fixedly attached thereto near the front or working end of the slide and this pin is pivotally engaged by the link 14 in a hole formed at the forward end thereof. A similar hole is formed in this link 14 near the other end thereof for the purpose of pivotally engaging the crank pin 15a that is fixedly attached to the rotary drive member 15 and is positioned on said drive member so as to provide limited oscillating movement to the slide 13. The member 15 is adapted to be driven from an electric drill through a shaft 15b that is constructed as described in my previous patent, No. 2,783,790.

The forward end of the slide 13 is shown more clearly in Figures 2 and 3. This end of the slide 13 is provided with a threaded hole 16 that is adapted to receive the machine screw 17. A clamp member 18, which is of U-shaped configuration, is provided for the purpose of clamping the saw blade 19 against the forward end of the slide 13. For this purpose, the clamp 18 is provided with a hole 20 that is adapted to receive the screw 17 and the saw blade 19 is provided with a notch 21, also for the purpose of receiving the screw 17. The clamped end of the saw blade 19 is preferably of a width equal to the distance between the inner surfaces of the sides 18a and 18b of the clamp 18 so that when the saw is clamped to the working end of the slide 13 by the clamp 18 and the screw 17, the saw is held rigidly in place on this slide. A washer 23 having a hole 23a that is substantially larger than the hole 20 formed in the clamp 18 may be employed to provide space for the depending flange that is formed on the bottom side of the hole 20 when this hole is counter sunk to receive the head of the screw 17. The clamp 18 is also provided with a small projection 22 having a width equal to the width of the notch 23b of the washer 23 so that the saw blade may be more positively clamped between the flat surfaces of this washer and the slide 13.

The slide 13 is made of elongated configuration and the rear portion thereof is of a width such that it slidably fits between the surfaces 10a and 10b formed in the sides of the cavity in the body 10 so that these surfaces 10a and 10b guide the rear portion of this slide. The forward portion of the cavity in the body 10 is made of a width equal to the width of the U-shaped clamp 18 as shown in Figure 2 and this portion of the cavity is provided with surfaces 10c and 10d which slidably contact the sides of the U-shaped clamp 18. These surfaces 10c and 10d therefore are subjected to considerable wear when the device is employed for sawing through a piece of material, inasmuch as pressure necessary to urge the saw 19 through the work material is communicated to these surfaces.

After considerable experience with devices of this character, it was found that perfectly smooth surfaces on the sides of the clamp 18 were not desirable and that much greater efficiency and longer life was obtained by providing small inwardly curved flutes or grooves 24, as shown in Figure 4, which may be of irregular nature and which lie between relatively flat areas 25, such as shown in Figure 6, in which figure these grooves are illustrated magnified approximately 20 diameters. These grooves are provided to the outer surfaces of both of the sides of the clamp 18 and they are formed by passing the clamp 18 between a pair of grinding wheels 27 and 28 so that grooves having the configuration shown in the enlarged view, Figure 5, are formed on both of these sides. For this purpose the clamps 18 are mounted on the turret 29 which is rotated by the shaft 30 and the clamps 18 which are held on the turret by spring clips 31, are passed between the rotating grinding wheels 27 and 28 in a direction corresponding substantially to a radial direction of said wheels. Thereafter, the sharp edges 26 of these grooves are removed either by honing or by tumbling a plurality of the clamps 18 together in a tumbler. As a result, a configuration such as shown in Figure 6 is produced in which the sharp edges 26 are removed and plain areas 25 are provided between the grooves 24. Prior to this honing or tumbling operation the clamps 18 are subjected to a conventional surface hardening process which may be performed after the honing or tumbling operation if desired.

The grooves 24 are preferably of curved configuration as shown in Figure 4 so that they function to distribute the lubricant to the slidable contacting surfaces more efficiently. Thus when the clamp 18, Figure 4, slides to the left, the lubricant is gathered into the curved grooves 24 and moved toward the centers thereof. When the clamp 18 slides to the right the slidably contacting surfaces 10c and 10d coacting with these grooves cooperate with the clamp 18 to draw the lubricant out of the grooves toward the ends thereof. This action takes place many times a minute during the oscillatory movement of the saw blade and as a result wear on the slidably contacting surfaces is greatly reduced.

The proper curvature may be provided to the grooves 24 by selecting grinding wheels 27 and 28 of the proper diameter which is such that the radius of said wheels is substantially the same as the radius of the arcuate grooves 24.

Lubricating materials, such as, finely divided or powdered graphite mixed with grease may be used with good results and the sliding surfaces 10c and 10d of the body 10 and the clamp 18 thus saved from excessive wear during long periods of use of the device.

While I have shown a preferred embodiment of the invention it will be understood that the invention is capable of variation and modification from the form shown so that its scope should be limited only by the scope of the claims appended hereto.

What I claim is:

1. In a device adapted to be driven by a portable electric drill which device is provided with a body structure of elongated shape forming a hand grip inside of which there is provided a guide for slidably mounting a reciprocatory slide which is adapted to be driven by the electric drill and to which a working tool is detachably secured by a clamp which slidably engages said guide, the combination with said clamp of grooved surfaces for collecting and discharging lubricant during reciprocation of said slide and said clamp so that wear between said grooved surfaces of said clamp and said guide is reduced.

2. In a device adapted to be driven by a portable electric drill which device is provided with a body structure of elongated shape forming a hand grip inside of which there is provided a guide for slidably mounting a reciprocatory slide which is adapted to be driven by the electric drill and to which a working tool is detachably secured by a clamp which slidably engages said guide, the combination with said clamp of inwardly curved grooved surfaces which are filled with lubricant during the inward stroke of said slide and said clamp and out of which said lubricant is urged during the outward stroke of said slide and said clamp whereby wear between said grooved surfaces of said clamp and said guide is reduced.

3. In a device adapted to be driven by a portable electric drill which device is provided with a body structure of elongated shape forming a hand grip inside of which there is provided a guide for slidably mounting a reciprocatory slide which is adapted to be driven by the electric drill and to which a working tool is detachably secured by a clamp which slidably engages said guide, the combination with said clamp of lubricant carrying grooved surfaces, the grooves of said surfaces being shaped so that they are filled with lubricant during one stroke of said slide and expelled therefrom in the following stroke thereof during reciprocation of said slide so that wear between said grooved surfaces and said guide is reduced.

References Cited in the file of this patent

UNITED STATES PATENTS

| | | |
|---|---|---|
| 1,184,406 | Bache | May 23, 1916 |
| 1,442,337 | Hannaford | Jan. 16, 1923 |
| 1,921,039 | Remington | Aug. 8, 1933 |
| 2,217,045 | Faulder | Oct. 8, 1940 |
| 2,359,323 | Lupo | Oct. 3, 1944 |
| 2,537,501 | Woodward | Jan. 9, 1951 |
| 2,604,363 | Daugherty | July 22, 1952 |
| 2,621,685 | Butz | Dec. 16, 1952 |
| 2,631,068 | Saul | Mar. 10, 1953 |
| 2,668,567 | Olson | Feb. 9, 1954 |
| 2,729,522 | Bechler | Jan. 3, 1956 |
| 2,735,458 | Buchmann | Feb. 21, 1956 |
| 2,783,790 | Keesling | Mar. 5, 1957 |
| 2,783,792 | Keesling | Mar. 5, 1957 |

FOREIGN PATENTS

| | | |
|---|---|---|
| 208,301 | Switzerland | Apr. 16, 1940 |